(12) United States Patent
Gossner

(10) Patent No.: US 9,255,852 B2
(45) Date of Patent: Feb. 9, 2016

(54) VIBRATION AND DYNAMIC ACCELERATION SENSING USING CAPACITORS

(71) Applicant: TEXAS INSTRUMENTS DEUTSCHLAND GmbH, Freising (DE)

(72) Inventor: Kai Gossner, Neukirchen-Vluyn (DE)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 54 days.

(21) Appl. No.: 14/136,145

(22) Filed: Dec. 20, 2013

(65) Prior Publication Data

US 2015/0053023 A1 Feb. 26, 2015

Related U.S. Application Data

(60) Provisional application No. 61/869,952, filed on Aug. 26, 2013.

(51) Int. Cl.
| | |
|---|---|
| *G01L 1/16* | (2006.01) |
| *G01L 1/14* | (2006.01) |
| *G01C 19/5719* | (2012.01) |
| *G01P 15/125* | (2006.01) |
| *H01G 5/38* | (2006.01) |

(52) U.S. Cl.
CPC ............ *G01L 1/148* (2013.01); *G01C 19/5719* (2013.01); *G01P 15/125* (2013.01); *H01G 5/38* (2013.01)

(58) Field of Classification Search
CPC ... G01C 19/5719; G01L 1/148; G01P 15/125; H01G 5/38
USPC .................. 73/780, 862.337, 862.626, 862.68
See application file for complete search history.

(56) References Cited

U.S. PATENT DOCUMENTS

| | | | | |
|---|---|---|---|---|
| 4,584,569 | A | * | 4/1986 | Lopez et al. ................... 340/566 |
| 5,492,016 | A | * | 2/1996 | Pinto et al. ........................ 73/724 |
| 2004/0187577 | A1 | * | 9/2004 | Higuchi et al. ............. 73/514.29 |
| 2005/0210980 | A1 | * | 9/2005 | Umemura et al. .......... 73/514.32 |
| 2006/0006883 | A1 | * | 1/2006 | Foote ............................. 324/678 |
| 2012/0050206 | A1 | * | 3/2012 | Welland ........................ 345/174 |
| 2012/0210790 | A1 | * | 8/2012 | Kuang et al. ................ 73/504.12 |

* cited by examiner

*Primary Examiner* — Max Noori
(74) *Attorney, Agent, or Firm* — Gregory J. Albin; Frank D. Cimino

(57) ABSTRACT

The present disclosure relates to an apparatus comprising at least one sensing capacitor and a controller, wherein the controller is configured to receive a signal from the at least one sensing capacitor indicative of a change of charge of the sensing capacitor, and wherein the controller is configured to determine an amount of force applied to the sensing capacitor, an acceleration of the sensing capacitor, a torsion of the sensing capacitor, a vibration of the sensing capacitor or a pulling force applied to the sensing capacitor based on the change of charge of the at least one sensing capacitor.

20 Claims, 5 Drawing Sheets

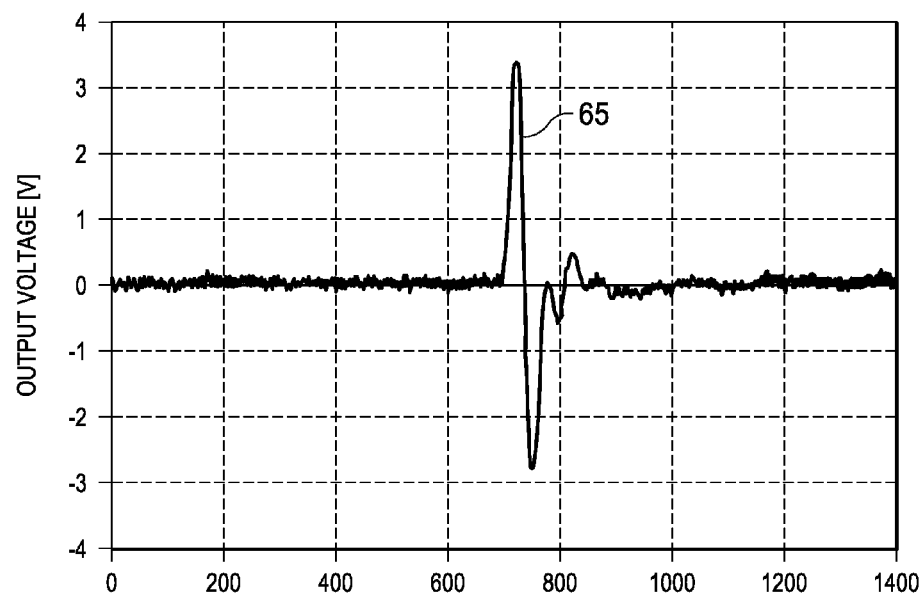
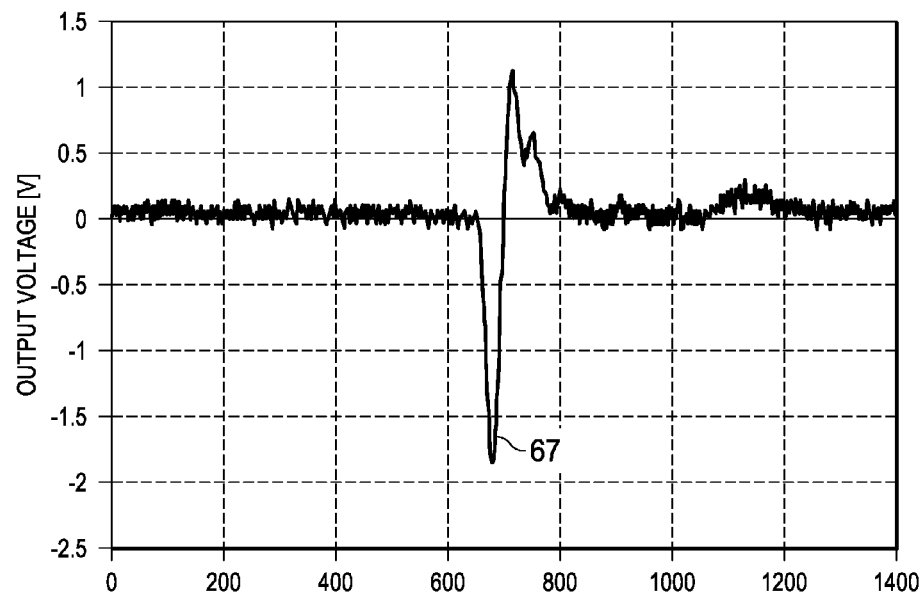

VIBRATION AND DYNAMIC ACCELERATION SENSING USING CAPACITORS

RELATED APPLICATION

This application claims the benefit, under 35 U.S.C. §119 (e), of U.S. Provisional Patent Application No. 61/869,952, filed Aug. 26, 2013, which is incorporated herein by reference in its entirety.

FIELD

This disclosure relates to the measuring of a force, a vibration or a torsion applied to a force sensor. More specifically, the examples of the present disclosure relate to measuring the charge of a sensing capacitor and determining a force, a vibration or a torsion applied to the sensing capacitor based on said change of charge.

BACKGROUND

An apparatus that is configured to sense a mechanical force requires a sensing element. It is known in the state of the art to use piezo sensors or micro-optoelectro-mechanical systems sensors (MEMS sensors) for measuring mechanical forces. In addition, it is known in the state of the art to use capacitors to sense mechanical forces. To measure a mechanical force with the help of the known sensing capacitors the capacitance change is detected and the mechanical forces are determined based on the change of capacitance of the sensing capacitors. According to one example, at least one of the conductors of a capacitor like a plate of a plate-type capacitor is moveable relative to the dielectric in response to an applied mechanical force. Thereby, the capacitance of the capacitor changes and based on said change of capacitance the applied mechanical force can be determined.

One disadvantage of the known sensing elements for mechanical forces is that they have to be individualized to each type of application. Furthermore, the sensing capacitors known that allow a measurement of mechanical forces based on their change of capacitance are expensive compared to standard capacitors.

Moreover, said piezo and MEMS sensors may not be mounted to printed circuit board using integrated process technology easily. For example, piezo sensors are sensitive to heat and soldering cables may damage the piezo sensors. Furthermore, MEMS sensors may not be capable to respond to high frequencies.

It is therefore one objective of the present disclosure to overcome the problems of measuring mechanical forces by a sensor that may be coupled to a circuit board by using integrated process technology easily and that is of low costs. Another object of the present invention is to provide a sensor that allows a measuring of mechanical forces with a high frequency response.

SUMMARY

One aspect of the present disclosure is an apparatus comprising at least one sensing capacitor and a controller. The controller may be configured to receive a signal from the at least one sensing capacitor indicative of a change of charge of the sensing capacitor. The controller may be configured to determine an amount of force applied to the sensing capacitor, an acceleration of the sensing capacitor, a torsion of the sensing capacitor, a vibration of the sensing capacitor and/or a pulling force applied to the sensing capacitor based on the change of charge of the at least one sensing capacitor.

The use of a signal from the sensing capacitor indicative of a change of charge of the sensing capacitor for determining mechanical forces allows to provide a low power consumption apparatus. Moreover, the used sensing capacitor is very cheap compared to piezo sensors or MEMS sensors, and may be coupled to a circuit board by using integrated process technology easily.

The change of charge of the sensing capacitor is based on the piezo effect. In general, said piezo effect of capacitors is recognized due to a decrease of capacitance depending on the DC voltage of a capacitor.

Therefore, standard capacitors like ceramic or silicon capacitors without moveable elements may be used as sensing capacitors according to the present disclosure for measurement of mechanical forces.

The piezo effect of a capacitor depends on its dielectric. For example, capacitors having Y5V or X7R as their dielectric are highly sensitive to applied mechanical forces, whereas e.g. capacitors having NP0 as the dielectric are less sensitive to applied mechanical forces.

According to one example of the present disclosure, a capacitor may have Y5V or X7R as the dielectric.

According to one example of the present disclosure, a charge amplifier may be connected between the at least one sensing capacitor and the controller.

Thereby, it may be of advantage to provide a charge amplifier optimized for low noise and high density.

According to one example of the present disclosure, the charge amplifier comprises at least a first operational amplifier. According to this example, at least one first capacitor may be connected between the output of the operational amplifier and the inverting input of the first operational amplifier.

In the alternative, according to one example of the present disclosure the charge amplifier may comprise at least a first and at least a second operational amplifier, wherein the inverting input of the first operational amplifier may be connected to the first terminal of the at least one sensing capacitor and the inverting input of the second operational amplifier may be connected to the second terminal of the at least one sensing capacitor. The first capacitor may be connected between the output of the first operational amplifier and the inverting input of the first operational amplifier and the second capacitor may be connected between the output of the second operational amplifier and the inverting input of the second operational amplifier.

According to one example, a third operational amplifier may be connected to the output of the first and the second operational amplifier. Thereby, the third operational amplifier may provide a further amplification of the signal from the at least one sensing capacitor indicative of a change of charge of the sensing capacitor and a reduction of noise.

The input impedance of a charge amplifier according to the present examples may be very high. It may pickup the 50 Hz or 60 Hz signals from the mains if the sensing capacitor and the charge amplifier may be coupled within an electric circuit. This pickup may be higher in case of long connecting lines between the sensing capacitor and the charge amplifier. According to one example of the present disclosure, the connecting lines between the sensing capacitor and the charge amplifier may reside between ground connecting lines to provide a good shielding and reducing the pickup.

According to one example of the present disclosure, the at least one sensing capacitor may be coupled to a printed circuit board (PCB).

This may provide an easy and cheap possibility to couple the sensing capacitor with the charge amplifier and other electric devices. A PCB may mechanically support and electrically connect electronic components using conductive tracks, pads and other. A PCB may be provided using materials like laminates, copper-clad laminates, resin impregnated B-stage cloth (Pre-preg), copper foil or ceramic.

According to another example of the present disclosure, the PCB may comprise cuts in form of segments of a circle, wherein at least a first and at least a second cut may be arranged symmetrically and mirrored around the centre of the circle, and wherein the at least one sensing capacitor may be coupled to the PCB at the centre of the circle or between the first and the second cuts.

This example allows a movement of the centre of the circle and the sensing capacitor coupled thereto as a sensing area relative to the remaining parts of PCB. The measurable voltage amplitude of the sensing capacitor is linear to dynamic forces applied to the sensing area. Therefore, an acceleration measurement or a force sensitive button may be provided according to this example.

According to one example of the present invention an inertia may be coupled to the PCB at the centre of the circle. For example, a charge amplifier or parts of a charge amplifier are connected between the at least one sensing capacitor and the controller and the charge amplifier or parts of the charge amplifier coupled to the PCB at the centre of the circle.

Such an inertia may be of advantage to improve the movement of the sensing area in reaction to applied mechanical forces and therefore may allow improved measurement results.

According to the example, the controller may be configured to determine an amount of force applied to the sensing capacitor or an acceleration of the sensing capacitor applied to the sensing capacitor based on the change of charge of the at least one sensing capacitor.

According to another example of the present disclosure, the PCB may comprise at least two longitudinal cuts arranged in parallel to each other, and wherein the at least one sensing capacitor is coupled to the PCB between and equally spaced from the at least two longitudinal cuts.

It is obvious for those skilled in the art that multiple sensing capacitors may be arranged on the PCB. For example, a first sensing capacitor may be arranged between first cuts arranged in parallel to each other and a second sensing capacitor may be arranged between second cuts arranged in parallel to each other, and wherein the first and the second cuts are arranged shifted, rotated, parallel or vertical to each other.

According to this example, a charge amplifier or parts of a charge amplifier are connected between the at least one sensing capacitor and the controller is coupled to the PCB between and in equally spaced from the at least two longitudinal cuts.

Furthermore, according to this example, the controller may be configured to determine an amount of force applied to the sensing capacitor or an acceleration of the sensing capacitor applied to the sensing capacitor based on the change of charge of the at least one sensing capacitor.

According to another example of the present disclosure, a first sensing capacitor may be coupled to a first side of the PCB and a second sensing capacitor may be coupled to a second side opposite to the first side of the PCB, wherein the first and the second sensing capacitor are coupled to the PCB adjacent or directly opposite to each other.

This arrangement of at least two sensing capacitors may allow a differential measurement.

Thereby, the PCB may be of a longitudinal shape having a first end and a second end opposite to the first end and two longitudinal ends, wherein the first end may be affixable and the second end may be moveable, and wherein a charge amplifier or parts of a charge amplifier may be connected between the at least one sensing capacitor and the controller, and wherein the controller may be coupled to the PCB adjacent to the first end. The first and the second sensing capacitors may be coupled in a first distance from the first end to the PCB.

According to this example, the controller may be configured to determine an oscillation of the PCB based on an amount of force applied to the first and the second sensing capacitor based on the change of charge of the first and the second sensing capacitor.

According to another example of the present disclosure, the PCB may be of a longitudinal shape having a first end and a second end opposite to the first end and two longitudinal ends, wherein the first end is affixable and the second end may be rotatable, and wherein the two conductors and the dielectric of the at least one sensing capacitor may be coupled to the PCB vertically to the rotation axis of the PCB.

By arranging the two conductors and the dielectric of sensing capacitor in parallel to the torsion forces applied to the PCB said torsion forces may be measured.

According to this example, the controller may be configured to determine a torsion force applied to the sensing capacitor based on the change of charge of the at least one sensing capacitor.

According to another example, the PCB may be of a longitudinal shape having a first end and a second end opposite to the first end and two longitudinal ends, wherein the first end is affixable and the second end may be rotatable, and wherein the at least one sensing capacitor may be coupled to the PCB adjacent to and spaced from the first end of the PCB in a first distance, and wherein the charge amplifier may be coupled to the PCB adjacent to and spaced from the first end of the PCB in a second distance, the second distance being smaller than the first distance.

According to this example the controller may be configured to determine a vibration of the sensing capacitor based on the change of charge of the at least one sensing capacitor.

According to another example of the present disclosure, the PCB may be arranged within a pressure cell, and wherein the PCB may divide the pressure cell into a first and a second pressure chamber, and wherein the first pressure chamber may comprise a first opening for applying a first pressure to the first pressure chamber and the second pressure chamber may comprise a second opening for applying a second pressure to the second pressure chamber, and wherein a first sensing capacitor may be coupled to a first side of the PCB and a second sensing capacitor may be coupled to a second side opposite to the first side of the PCB, wherein the first and the second sensing capacitor may be coupled to the PCB adjacent or directly opposite to each other.

According to this example, the controller may be configured to determine a differential pressure applied to the first and the second sensing capacitor based on the change of charge of the first and the second sensing capacitor.

According to another example of the present disclosure, the PCB may be of a longitudinal shape having a first end and a second end opposite to the first end and two longitudinal ends, wherein the first end may be affixable and the second end may be moveable, and wherein the two conductors and the dielectric of the at least one sensing capacitor may be coupled to the PCB in parallel to the two longitudinal ends.

According to this example, the controller may be configured to determine a pulling force applied to the second end of the PCB based on the change of charge of the at least one sensing capacitor.

According to one example of the present disclosure, the at least one sensing capacitor is a ceramic capacitor or a silicon capacitor.

Ceramic capacitors and silicon capacitors provide a piezo effect that is measurable by a change of charge of the respective capacitor, wherein standard capacitors may be used.

According to another example of the present disclosure the at least one sensing capacitor is coupled to the PCB by using integrated circuit technology.

This may reduce the cost during manufacturing.

According to another example of the present disclosure a method comprising the steps measuring a change of charge of a of a sensing capacitor; and determining an amount of force applied to the sensing capacitor, an acceleration of the sensing capacitor, a torsion of the sensing capacitor, a vibration of the sensing capacitor or a pulling force applied to the sensing capacitor based on the change of charge of the at least one sensing capacitor is provided.

According to one example of the present disclosure, the method may employ an apparatus according to one example of the present disclosure.

According to one example, an apparatus according to the present disclosure may be used for flow sensing, both Vortex or turbulence sensing, bearing wear monitoring and/or acceleration sensing, sensing of strain gauges and/or vibration sensing. In addition to, the apparatus may be used as a knock sensor, e.g. to make mobile devices detect knocks, e.g. a watch that triggers functions when knocked on by a finger. Thereby, for example, according to one example a knocking on a plate may be localized by the help of a triangulation. A possible use of such a triangulation may for example be a user interface behind a massive plate. Such a user interface is not realizable with the capacitive sensors known in the state of the art. Another example of a use of an apparatus according to the present disclosure may be the measurement of rotation speed by harmonic analysis and/or to detect the direction of an impact and/or an acceleration with multiple sensors.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 11b illustrates a first resulting waveform of a test of the apparatus of FIG. 11a; and FIG. 11c illustrates a second resulting waveform of a test of the apparatus of FIG. 11a.

DETAILED DESCRIPTION OF THE DRAWINGS

While illustrative examples are illustrated and described below, it will be appreciated that various changes can be made therein without departing from the spirit and scope of the disclosure. In that regard, the detailed description set forth below, in connection with the appended drawings is intended only as a description of various examples of the disclosed subject matter and is not intended to represent the only examples. Each example described in this disclosure is provided merely as an example or illustration and should not be construed as preferred or advantageous over other examples. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

Figure 1:
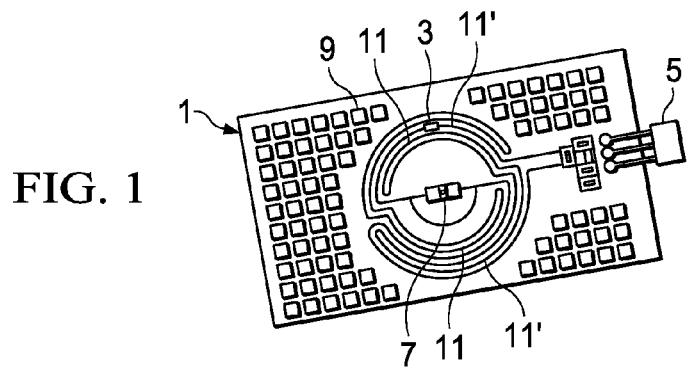
FIG. 1 illustrates an example apparatus of vibration and dynamic acceleration sensing using capacitors.

Examples of the present disclosure may be practiced with an apparatus shown in FIG. 1. The apparatus 1 comprises one sensing capacitor 3 and a controller 5. The controller 5 is configured to receive a signal from the sensing capacitor 3 indicative of a change of charge of the sensing capacitor 3. Based on said signal, the controller 5 is configured to determine an amount of force applied to the sensing capacitor 3, in particular an acceleration of the sensing capacitor 3. The sensing capacitor 3 is thereby coupled to a printed circuit board (PCB) 9.

A charge amplifier 7 is connected between the sensing capacitor 3 and the controller 5 to amplify the signal sensed by the controller 5. The PCB 9 comprise cuts 11 in form of segments of a circle, wherein first cuts 11 and second cuts 11' are arranged symmetrically and mirrored around the centre of the circle.

The apparatus according to FIG. 1 may therefore allow a movement of the centre of the circle and the sensing capacitor 3 coupled between the first and the second cuts 11, 11' as a sensing area relative to the remaining parts of PCB 9. The charge amplifier 7 is thereby coupled to the PCB as inertia for the sensing capacitor 3

The measurable voltage amplitude of the sensing capacitor 3 is linear to dynamic forces applied to the sensing area. Therefore, for example an acceleration measurement or a force sensitive button may be provided.

Figure 2:
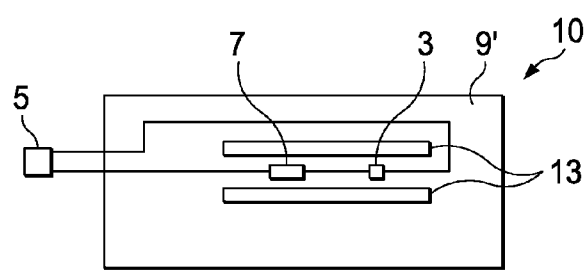
FIG. 2 illustrates another example apparatus of vibration and dynamic acceleration sensing using capacitors.

Examples of the present disclosure may further be practiced with an apparatus shown in FIG. 2.

The apparatus 10 according to FIG. 2 comprises a sensing capacitor 3 and a charge amplifier 7. The sensing capacitor 3 and the charge amplifier 7 are couple to a PCB 9'. The PCB 9' comprises two longitudinal cuts 13 arranged in parallel to each other. As shown in FIG. 2, the sensing capacitor 3 and the charge amplifier 7 are coupled to the PCB 9' between and equally spaced from the two longitudinal cuts 13. The charge amplifier 7 is further connected between the sensing capacitor 3 and the controller 5 to amplify a signal sensed by the controller 5 representative for a change of charge of the sensing capacitor 3.

The controller 3 may be configured to determine an amount of force applied to the sensing capacitor 3 or an acceleration of the sensing capacitor 3 applied to the sensing capacitor 3 based on the change of charge of the at least one sensing capacitor 3.

Figure 3:
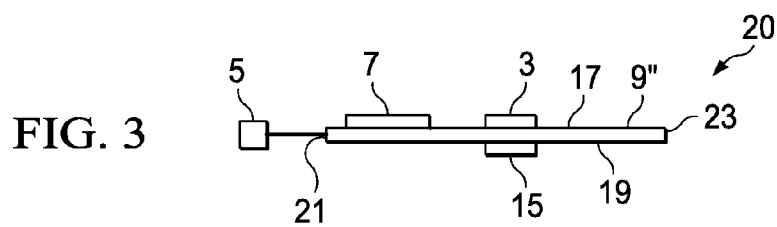
FIG. 3 illustrates a further example apparatus of vibration and dynamic acceleration sensing using capacitors.

Examples of the present disclosure may further be practiced with an apparatus shown in FIG. 3.

The apparatus 20 according to FIG. 3 comprises a first and a second sensing capacitor 3, 15 and a charge amplifier 7 coupled to a PCB 9".

The first sensing capacitor 3 is coupled to a first side 17 of the PCB 9" and the second sensing capacitor 15 is coupled to a second side 19 opposite to the first side 17 of the PCB 9", wherein the first and the second sensing capacitor 3, 15 are coupled to the PCB 9" directly opposite to each other. This arrangement of the first and the second sensing capacitor 3, allows a differential measurement.

Thereby, the PCB 9" is of a longitudinal shape having a first end 21 and a second end 23 opposite to the first end 21. The first end 21 is fixed and the second end 23 is moveable. According to this example, the controller 5 is configured to determine an oscillation of the PCB 9" based on an amount of force applied to the first and the second sensing capacitor 3, 15 based on the change of charge of the first and the second sensing capacitor 3, 15. A possible employment of an apparatus according to FIG. 3 may be a Vortex flowmeter, wherein the oscillation of the second end 23 of the PCB 9" may be proportional to the volume flow rate to be measured. For amplification of the signal representative of the change of charge of the first and the second sensing capacitor 3, 15 a charge amplifier is connected between said two sensing capacitors 3, 15 and the controller 5.

Figure 4:
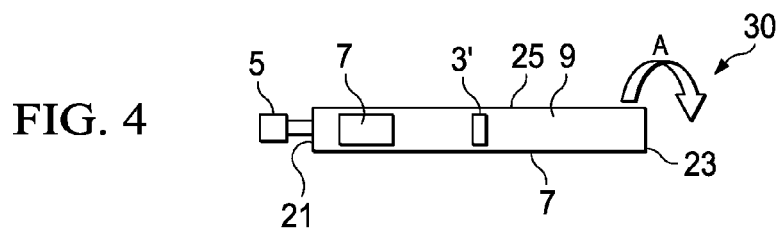
FIG. 4 illustrates a yet further example of an apparatus of vibration and dynamic acceleration sensing using capacitors.

The apparatus 30 according to FIG. 4 comprises a sensing capacitor 3' and a charge amplifier 7 coupled to a PCB 9.

The PCB 9 is of a longitudinal shape having a first end 21 and a second end 23 opposite to the first end and two longitudinal ends 25, 27, wherein the first end 21 is fixed and the second end 23 is rotatable. The two conductors and the dielectric of the sensing capacitor 3' is coupled to the PCB 9 vertically to the rotation axis A of the PCB 9. By arranging the two conductors and the dielectric of the sensing capacitor 3' in parallel to the torsion forces applied to the PCB β, said torsion forces may be measured. The controller 5 is configured to determine a torsion force applied to the sensing capacitor 3' based on the change of charge of the sensing capacitor 3'.

Figure 5:
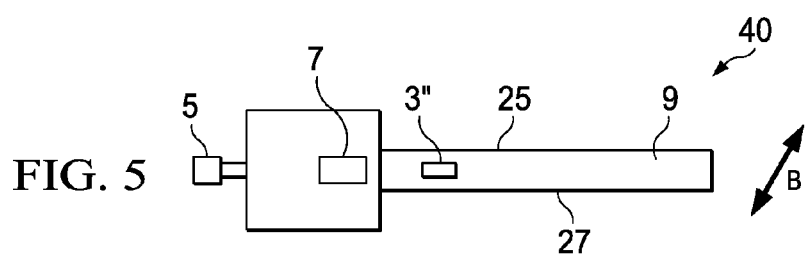
FIG. 5 illustrates a still yet further example of an apparatus of vibration and dynamic acceleration sensing using capacitors.

The apparatus 40 according to FIG. 5 comprises a sensing capacitor 3" and a charge amplifier 7 coupled to a PCB 9.

The PCB 9 may be of a longitudinal shape having a first end 21 and a second end 23 opposite to the first end and two longitudinal ends 25, 27, wherein the first end 21 is fixed and the second end 21 is moveable. The sensing capacitor 3" is coupled to the PCB 9 adjacent to and spaced from the first end 21 of the PCB 9 in a first distance, and wherein the charge amplifier 7 is coupled to the PCB 9 adjacent to and spaced from the first end 21 of the PCB in a second distance. The controller 5 is configured to determine a vibration of the sensing capacitor 3" based on the change of charge of the at least one sensing capacitor.

Figure 6:
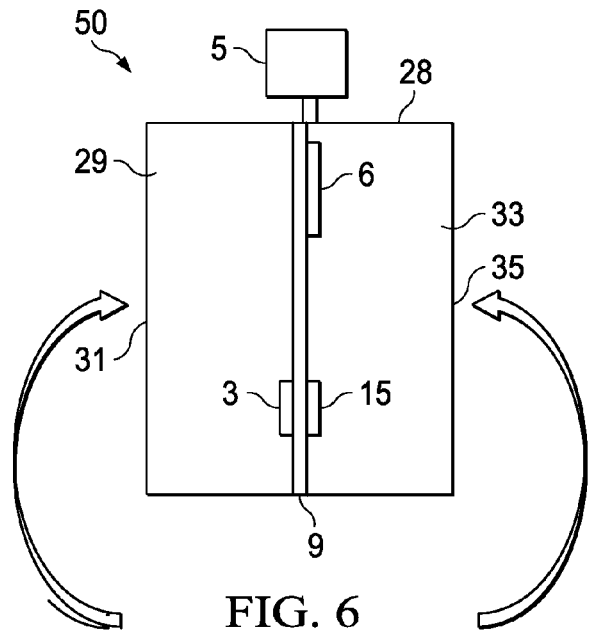
FIG. 6 illustrates a yet further example of an apparatus of vibration and dynamic acceleration sensing using capacitors including a first sensing capacitor, a second sensing capacitor and a charge amplifier coupled to a PCB.

The apparatus 50 according to FIG. 6 comprises a first sensing capacitor 3, a second sensing capacitor 15 and a charge amplifier 7 coupled to a PCB 9.

The PCB 9 is arranged within a pressure cell 28 and divides the pressure cell 28 into a first and a second pressure chamber 29, 33. The first pressure chamber 29 comprises a first opening 31 for applying a first pressure to the first pressure chamber 29 and the second pressure chamber 33 comprises a second opening 35 for applying a second pressure to the second pressure chamber 33. The first sensing capacitor 3 is coupled to a first side of the PCB 9 and the second sensing capacitor 15 is coupled to a second side opposite to the first side of the PCB 9. The first and the second sensing capacitor 3, 15 are coupled to the PCB 9 directly opposite to each other. According to this example, the controller 5 is configured to determine a differential pressure applied to the first and the second sensing capacitor 3, 15 based on the change of charge of the first and the second sensing capacitor 3, 15.

Figure 7:
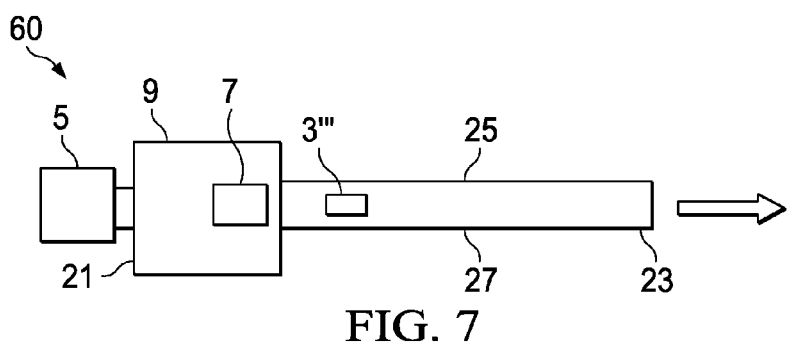
FIG. 7 illustrates a an apparatus of vibration and dynamic acceleration sensing using capacitors including a first sensing capacitor and a charge amplifier coupled to a PCB.

The apparatus 60 according to FIG. 7 comprises a first sensing capacitor 3''' and a charge amplifier 7 coupled to a PCB 9. The PCB 9 is of a longitudinal shape having a first end 21 and a second end 23 opposite to the first end and two longitudinal ends 25, 27. The first end 21 is fixed and the second end 23 is moveable. The two conductors and the dielectric of the sensing capacitor 3''' are coupled to the PCB 9 in parallel to the two longitudinal ends 25, 27. The controller 5 is thereby configured to determine a pulling force applied to the second end 23 of the PCB 9 based on the change of charge of the sensing capacitor 3'''.

The examples of the present disclosure according to FIGS. 1 to 7 may employ a ceramic capacitor or a silicon capacitor as the first or second sensing capacitor. Thereby, according to one example, the first and the second sensing capacitor may be coupled to the PCB by using integrated circuit technology.

Figure 8:
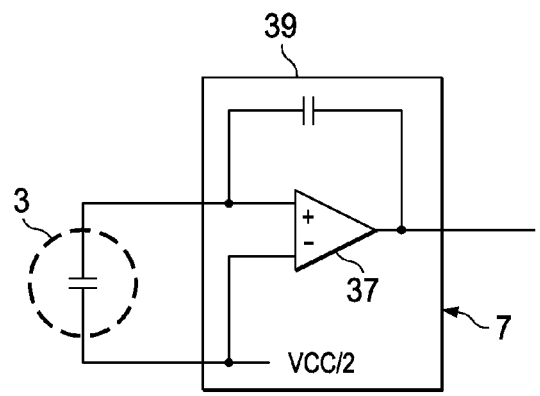
FIG. 8 illustrates a first charge amplifier.
Figure 9:
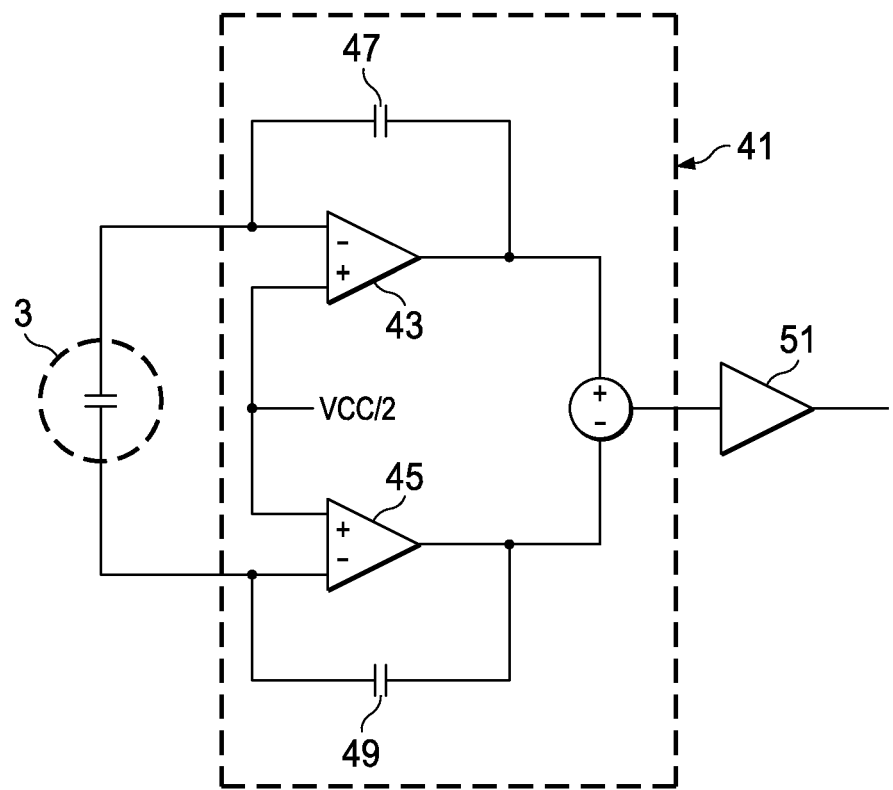
FIG. 9 illustrates a second charge amplifier.

FIGS. 8 and 9 show examples of charge amplifiers according to the present disclosure. A charge amplifier 7 according to FIG. 8 comprises a first operational amplifier 37 and a first capacitor 39. The first capacitor 39 is connected between the output of the operational amplifier 37 and the inverting input of the first operational amplifier 37. The sensing capacitor 3 is connected between the inverting and the non-inverting of the operational amplifier 37 for amplification of the signal representative for the charge of the sensing capacitor 3.

Figure 10A:
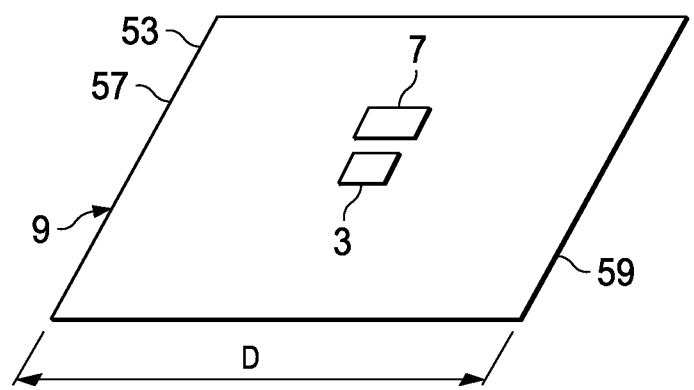
FIG. 10a illustrates an example apparatus according to the present disclosure.
Figure 10B:
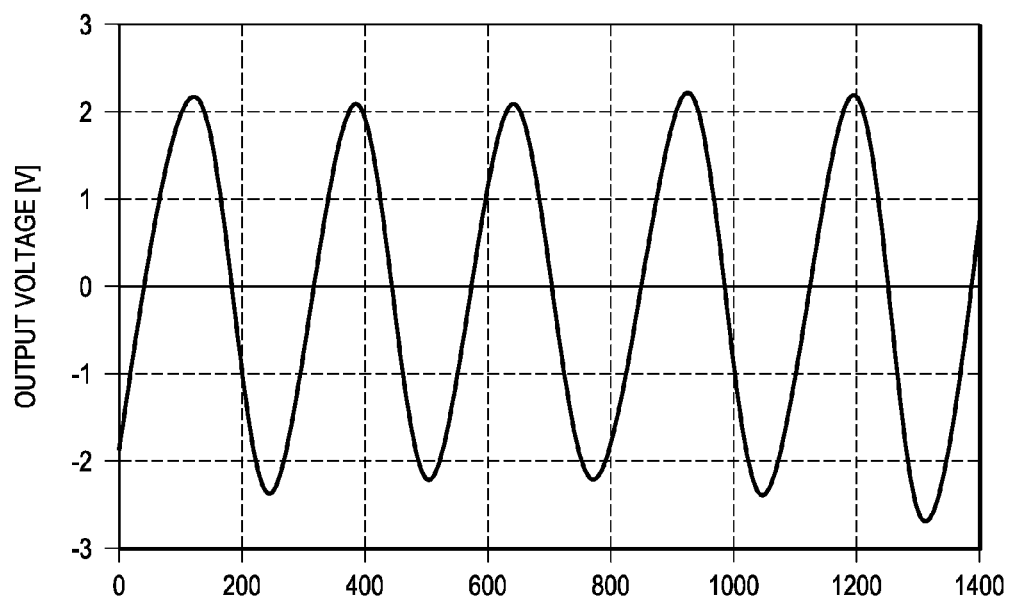
FIG. 10b illustrates a resultant testing of FIG. 10a with respect to applied mechanical forces.

An alternative charge amplifier 41 is shown in FIG. 9. The charge amplifier 41 comprises a first and a second operational amplifier 43, 45, wherein the inverting input of the first operational amplifier 41 is connected to the first terminal of the at least one sensing capacitor 3 and the inverting input of the second operational amplifier 45 is connected to the second terminal of the at least one sensing capacitor 3, and wherein the first capacitor 47 is connected between the output of the first operational amplifier 43 and the inverting input of the first operational amplifier 43 and the second capacitor 47 is connected between the output of the second operational amplifier 45 and the inverting input of the second operational amplifier 45. A third operational amplifier 51 is connected to the output of the first and the second operational amplifier 43, 45. Thereby, a differential amplifier in form of the first and the second operational amplifier 43, 45 and a subsequent third chopper operational amplifier 51 are provided. Such a differential measurement of the charge of the sensing capacitor by the first and the second operational amplifier 43, 45 may be of advantage to reduce disturbances. In case of both the first and the second operational amplifier 43, 45 having the same input impedance, disturbances capacitively coupled into may automatically be subtracted and therefore eliminated. The third chopper operational amplifier 51 may be of advantage in particular in case of the first and the second operational amplifier 43, 45 having a low amplification and the third operational amplifier 51 has a high amplification. Thereby, flicker noise may be reduced and the signal to noise ration may be improved significantly. FIG. 10a show an example of an apparatus 53 according to the present disclosure and the waveform in FIG. 10b of testing of such an apparatus with respect to applied mechanical forces. A sensing capacitor 3 and a charge amplifier 5 are coupled to a PCB 9. The first end 57 of the PCB 9 is fixed and the second end 59 of the PCB is moveable. The length D of the PCB is 5 cm. The charge amplifier comprise a operational amplifier with a 520 pF feedback capacitor and the sensing capacitor is a ceramic capacitor 1UF, 50V, X7R, 0805. The second end 59 of the PCB was bended up and down about 1 mm resulting in a change of charge of the sensing capacitor 3 as shown in FIG. 10b. Thereby it is proven that based on the change of charge of the sensing capacitor 3 deflection of the moveable second end 59 of the PCB 9 can be detected precisely.

Figure 11A:
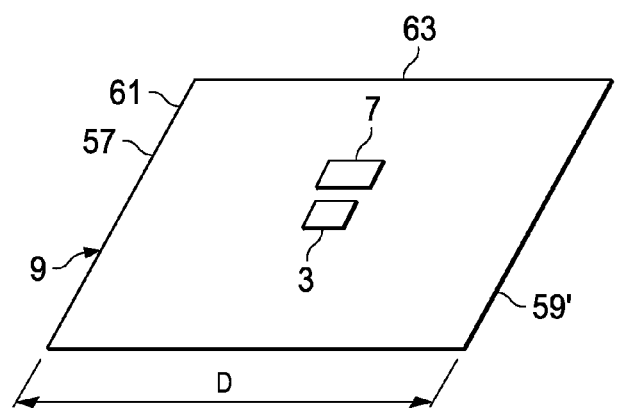
FIG. 11a illustrates an apparatus of an example of vibration and dynamic acceleration testing.

FIG. 11a, shows an example of an apparatus 63 according to the present disclosure FIGS. 11b and 11c show the first and second testing of such an apparatus with respect to applied mechanical forces. The difference between the apparatus shown in FIG. 10b is that both the first and the second end 57, 59 are fixed. By knocking on the PCB next to the charge amplifier 7 at 63, a positive slope 65 shown in FIG. 11b can be detected based on a change of charge of the sensing capacitor 3. By knocking on the back side of the PCB 9, a negative slope 67 shown in FIG. 11c can be detected.

As a result, with an apparatus according to the present disclosure based on the change of charge of a sensing capacitor mechanical forces can be measured precisely.

What is claimed is:

1. An apparatus comprising:
at least one sensing capacitor, and
a controller, configured to receive a signal from the at least one sensing capacitor indicative of a change of charge of the sensing capacitor, wherein the controller is configured to determine a plurality of:
an amount of force applied to the sensing capacitor,
an acceleration of the sensing capacitor, a torsion of the sensing capacitor,
a vibration of the sensing capacitor or
a pulling force applied to the sensing capacitor,
based on the change of charge of the at least one sensing capacitor,
wherein the at least one sensing capacitor is coupled to a printed circuit board (PCB), wherein
the PCB comprises cuts in form of segments of a circle, wherein at least a first and at least a second cut are arranged symmetrically and mirrored around a centre of the circle, and wherein the at least one sensing capacitor is coupled to the PCB at the centre of the circle or between the first and second cuts.

2. The apparatus of claim 1, further comprising a charge amplifier connected between the at least one sensing capacitor and the controller.

3. The apparatus of claim 2,
wherein the charge amplifier comprises at least a first operational amplifier.

4. The apparatus of claim 3, further comprising
at least one first capacitor connected between an output of the operational amplifier and an inverting input of the first operational amplifier.

5. The apparatus of claim 2,
wherein the charge amplifier comprises at least a first and at least a second operational amplifier, wherein an inverting input of the first operational amplifier is connected to a first terminal of the at least one sensing capacitor and an inverting input of the second operational amplifier is connected to a second terminal of the at least one sensing capacitor, and wherein a first capacitor is connected between an output of the first operational amplifier and the inverting input of the first operational amplifier, and a second capacitor is connected between an output of the second operational amplifier and the inverting input of the second operational amplifier.

6. The apparatus claim 5,
wherein a third operational amplifier is connected to the output of the first and second operational amplifiers.

7. The apparatus of claim 1,
wherein the at least one sensing capacitor is a ceramic capacitor or a silicon capacitor.

8. The apparatus of claim 1,
wherein the at least one sensing capacitor is coupled to the PCB by using integrated circuit technology.

9. The apparatus of claim 1, further comprising:
a charge amplifier or parts of a charge amplifier connected between the at least one sensing capacitor and the controller, wherein the charge amplifier or the parts of the charge amplifier are coupled to the PCB at the centre of the circle,
wherein the controller is configured to determine the amount of force applied to the sensing capacitor or the acceleration of the sensing capacitor based on the change of charge of the at least one sensing capacitor, and
the controller is coupled to the PCB between and equally spaced from the first and second cuts.

10. The apparatus of claim 1,
wherein the controller is configured to determine the amount of force applied to the sensing capacitor or the acceleration of the sensing capacitor based on the change of charge of the at least one sensing capacitor.

11. The apparatus of claim 1,
wherein the PCB comprises at least two longitudinal cuts arranged in parallel to each other, and wherein the at least one sensing capacitor is coupled to the PCB between and equally spaced from the at least two longitudinal cuts.

12. The apparatus of claim 1,
wherein a first sensing capacitor is coupled to a first side of the PCB and a second sensing capacitor is coupled to a second side opposite to the first side of the PCB, and wherein the first and second sensing capacitors are coupled to the PCB adjacent or directly opposite to each other.

13. The apparatus of claim 12,
wherein the PCB is of a longitudinal shape having a first end and a second end opposite to the first end and two longitudinal ends, wherein the first end is affixable and the second end is moveable, wherein a charge amplifier or parts of a charge amplifier are connected between at least one of the first and second sensing capacitors and the controller, wherein the controller is coupled to the PCB adjacent to the first end, and wherein the first and second sensing capacitors are coupled at a first distance from the first end to the PCB.

14. The apparatus of claim 11,
wherein the controller is configured to determine an oscillation of the PCB based on an amount of force applied to the first and second sensing capacitors and based on the change of charge of the first and second sensing capacitors.

15. The apparatus of claim 1,
wherein the PCB is of a longitudinal shape having a first end and a second end opposite to the first end and two longitudinal ends, wherein the first end is affixable and the second end is rotatable, wherein two conductors and a dielectric of the at least one sensing capacitor are coupled to the PCB vertically to a rotation axis of the PCB, wherein the controller is configured to determine the torsion force applied to the sensing capacitor based on the change of charge of the at least one sensing capacitor, wherein the second end is moveable, wherein the at least one sensing capacitor is coupled to the PCB adjacent to and spaced from the first end of the PCB at a first distance, wherein the charge amplifier is coupled to the PCB adjacent to and spaced from the first end of the PCB at a second distance, the second distance being smaller than the first distance, and wherein the controller is configured to determine the vibration of the sensing capacitor based on the change of charge of the at least one sensing capacitor.

16. The apparatus of claim 1, wherein the PCB is arranged within a pressure cell, wherein the PCB divides the pressure cell into first and second pressure chambers, wherein the first pressure chamber comprises a first opening for applying a first pressure to the first pressure chamber, and the second pressure chamber comprises a second opening for applying a second pressure to the second pressure chamber, wherein a first sensing capacitor is coupled to a first side of the PCB and a second sensing capacitor is coupled to a second side opposite to the first side of the PCB, wherein the first and second sensing capacitors are coupled to the PCB adjacent or directly opposite to each other, wherein the controller is configured to determine a differential pressure applied to the first and second sensing capacitors based on the change of charge of the first and second sensing capacitors, wherein the PCB is of a longitudinal shape having a first end and a second end opposite to the first end and two longitudinal ends, wherein the first end is affixable and the second end is moveable, wherein two conductors and a dielectric of the at least one sensing capacitor are coupled to the PCB in parallel to the two longitudinal ends, and wherein the controller is configured to determine a pulling force applied to the second end of the PCB based on the change of charge of the at least one sensing capacitor.

17. An apparatus comprising:

at least one sensing capacitor, and a controller configured to receive a signal from the at least one sensing capacitor indicative of a change of charge of the sensing capacitor, wherein the controller is configured to determine a plurality of:

an amount of force applied to the sensing capacitor, an acceleration of the sensing capacitor, a torsion of the sensing capacitor, a vibration of the sensing capacitor and a pulling force applied to the sensing capacitor based on the change of charge of the at least one sensing capacitor, wherein a charge amplifier is connected between the at least one sensing capacitor and the controller, wherein the charge amplifier comprises at least a first operational amplifier, wherein the at least one sensing capacitor is coupled to a printed circuit board (PCB), wherein the PCB comprises at least two longitudinal cuts arranged in parallel to each other, and wherein the at least one sensing capacitor is coupled to the PCB between and equally spaced from the at least two longitudinal cuts.

18. A method comprising:

measuring a change of charge of a sensing capacitor; and determining a plurality of:

an amount of force applied to the sensing capacitor, an acceleration of the sensing capacitor, a torsion of the sensing capacitor, a vibration of the sensing capacitor and a pulling force applied to the sensing capacitor, based on the change of charge of the at least one sensing capacitor.

19. The apparatus of claim 17, wherein the determination occurs in a series of separate determinations.

20. The apparatus of claim 17, wherein the determination occurs in a parallel.

* * * * *